Figure 1:
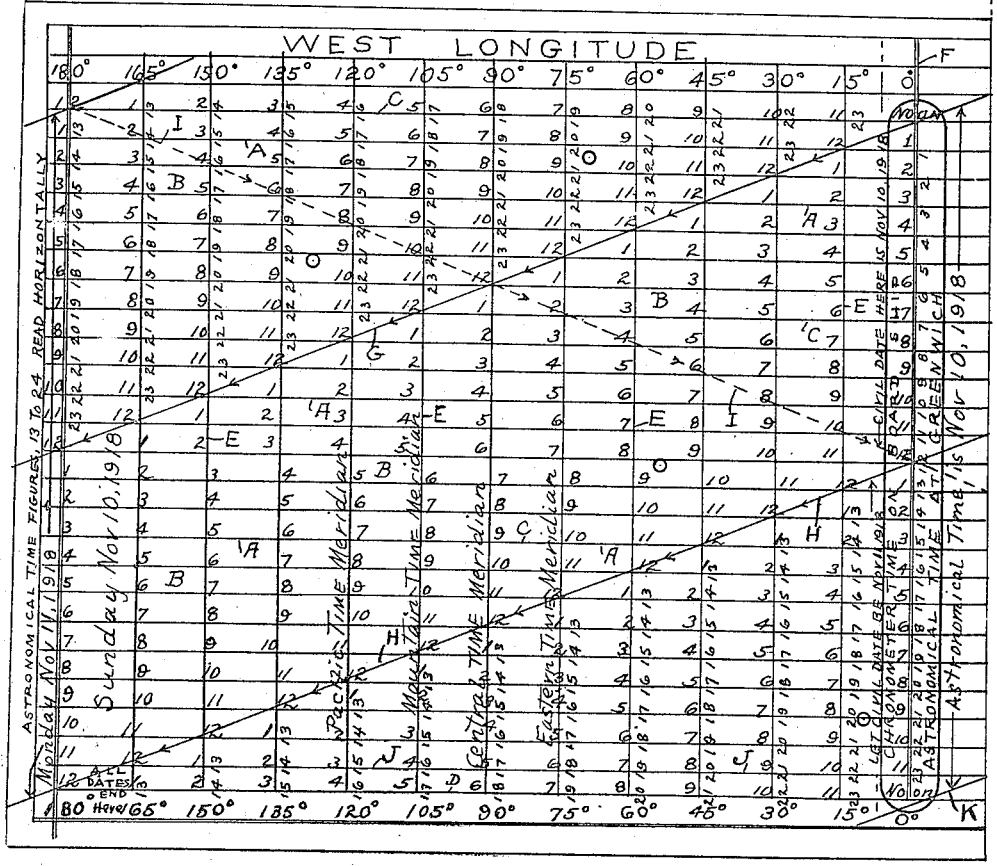

March 11, 1924.

C. M. THOMAS 1,486,553

SIMPLIFIED TIME CHART

Filed Feb. 28, 1922

2 Sheets—Sheet 1

Charles M. Thomas, Inventor

By Walter B. Burrow

Attorney

March 11, 1924.

C. M. THOMAS 1,486,553

SIMPLIFIED TIME CHART

Filed Feb. 28, 1922

2 Sheets-Sheet 2

Fig 2

Charles M. Thomas, Inventor

By Walter B. Burrow

Attorney

Patented Mar. 11, 1924.

1,486,553

UNITED STATES PATENT OFFICE.

CHARLES MITCHELL THOMAS, OF WYTHEVILLE, VIRGINIA.

SIMPLIFIED TIME CHART.

Application filed February 28, 1922. Serial No. 539,850.

*To all whom it may concern:*

Be it known that I, CHARLES MITCHELL THOMAS, a citizen of the United States, residing at Wytheville, in the county of Wythe and State of Virginia, have invented certain new and useful Improvements in Simplified Time Charts, of which the following is a specification.

My invention relates to simplified time charts.

The object of the invention is to provide a simple, quick and convenient means whereby proper time may be found in any part of the world.

Further objects and advantages will be more fully described herein and specifically pointed out in the claim hereunto annexed recourse being had to the accompanying drawing or diagram forming a part of this specification which is also the chart itself.

Like reference numerals indicate similar parts in all the views.

The simplified time chart consists primarily of twenty-five horizontal lines A which form twenty-four spaces B representing the twenty-four hours of the day, from noon at Greenwich, on the prime meridian of one day, and is shown by the horizontal line C marked "Noon" at the centre and "12" at each end and located at the top of the chart. This line shows the time all over the world at the beginning of each day at the 180th meridian.

The line D marked in a similar manner and located at the bottom of the chart represents the noon hour line at Greenwich twenty-four hours later, or noon the next day which was taken as Monday, November 11th, 1918, on account of the historical importance of that date, although the chart is equally good for any other date throughout the year.

The other twenty-three horizontal lines between the upper and lower Greenwich noon lines represent the other twenty-three hours of the day. Each horizontal line is an hour line and each intervening space represents sixty minutes of time.

The twenty-five vertical lines E represent meridians of longitude showing every 15 degrees of east and west longitude and are numbered at the top and bottom to show which meridian of longitude each line represents.

The 180th meridian is shown twice, once at each end of the chart.

The prime meridian, which passes through the Greenwich Observatory, is shown by the heavy vertical line F in the centre of the chart.

The twenty-four intervening spaces, between the twenty-five vertical lines, each represent 15 degrees of longitude through which the earth turns in one hour.

The oblique lines G and K across the chart represent the noon path of the sun, and the middle oblique line H represents the midnight line. These lines divide the time chart into a. m. and p. m. zones, and all the hour figures in each zone are to have these letters added after them, either a. m. or p. m. according to the zone in which the hour figure is found.

The line J represents the hour at which the World War ended. The dotted line I represents the time path of an imaginary aeroplane starting at mid-night at the 180th meridian and flying eastward around the world in twenty-four hours doing two apparent days in one day.

The development and scheme of the chart can be more easily understood if it be rolled once into the form of a cylinder making the two 180th meridians of longitude coincide and then held vertically.

Imagine it to be revolved once in 24 hours, and at the same time very slowly raised through its height in the same length of time from the top noon line to the bottom noon line, and this shows more clearly the idea of the oblique lines, also the a. m. and p. m. zones.

The four standard time meridians through the United States are shown with the proper time name for each.

Both the civil and astronomical hour figures are given on the chart at the intersection of the vertical and horizontal lines.

To tell the time anywhere throughout the world, first pick out the correct time on a given meridian of longitude which will be on, or parallel with, one of the vertical meridian lines, with a ruler or straight edge placed on the correct point and laid down parallel to the horizontal hour lines, it will be found to be the correct time at any meridian of longitude given at the intersection of the straight edge and the meridian of longitude.

Interpolation between the hour and meridian lines will sometimes be required.

A Mercator's map with corresponding meridians of longitude may be printed on the chart in a different color which will add to the convenience of finding the longitude for different places throughout the world thereby greatly facilitating the operation of finding the correct time at any place on the earth's surface.

As known, the earth is divided into 360 degrees of longitude 180 degrees east and 180 degrees west of the prime meridian line F, a true north and south through the astronomical observatory at Greenwich, England, and is also denoted by the zero mark, (0).

The earth revolves on its axis from the west towards the east, once every twenty-four hours and therefore the noon path of the sun moves in the opposite direction over the surface of the earth, from the east towards the west and crosses over 15 degrees of longitude every hour because 360 degrees divided by 24 equals 15 degrees per hour, as described.

The heavy vertical line F, at the centre of the chart and marked zero, is the prime meridian, and the other 24 vertical lines are meridians of longitude for every 15 degrees.

The 25 horizontal lines are the hour lines enclosing 24 spaces which represent the 24 hours of the day, from noon at Greenwich, November 10th, 1918, until noon the next day, (November 11th, 1918) one hour after the World War ended.

The historical importance of this date, which is that of the signing of the Armistice, is the reason it was taken as an example, although the chart is adapted to find the time from any date in any year.

The chart will be better understood, while being used, if it is rolled into a cylinder, making the two meridians coincide and then held vertically and imagine it to be revolved once in twenty-four hours, and at the same time, raised very slowly through its height, that is to say, from the top noon line to the bottom noon line.

In using my invention, take the following example: Find the civil and astronomical time at London and also at Japan, longitude 135 degrees east when it is 8 p. m., July 4th, at Washington, D. C.

Pick out the 75th meridian, west longitude, and on it find the 8 in the p. m. zones, (between the lines G and H), trace this hour out to the right. At London, the civil time is 1 a. m. July 5th; astronomical time is 13 hour, July 4, 1920, as the observer finds the 1 and the 13 on the zero meridian at the intersection.

In Japan, the civil time is 10 a. m. July 5th, and the astronomical time is 22 hour, July 4th, 1920, as the 10 and the 22 are found at the proper intersection.

The astronomical dates begin and end at noon, 12 hours after the civil date begins and are not denoted by a. m. or p. m.

The hour line next to the bottom line of the chart, gives the time all over the world at the hour when the World War ended.

The difference between the Greenwich mean time, shown on the zero meridian, and any other local mean time, at any place on the earth, on the same hour line when multiplied by 15, gives the longitude of the place, the astronomical time being used.

I claim:

A simplified time chart, of horizontal lines forming spaces representing the twenty-four hours of a day, a vertical zero dividing line separating chronometer and astronomical time and having meridional lines increasing to the right and left therefrom, diagonal lines intersecting said horizontal and vertical lines consisting of a middle midnight line and two noon path lines on each side thereof, of noon lines horizontally disposed at the top and bottom of the chart, and designating numbers readable vertically and horizontally at the intersection of the said vertical and horizontal lines.

In testimony whereof I have hereunto affixed my signature in the presence of two witnesses.

CHARLES MITCHELL THOMAS.

Witnesses:
  W. W. HANSON,
  BESSIE T. HANSON.